United States Patent
Park et al.

[11] Patent Number: 6,069,669
[45] Date of Patent: May 30, 2000

[54] VIDEO WINDOW CONTROL APPARATUS AND METHOD THEREOF

[75] Inventors: Jong-Hoon Park; Jin-Sang Choi; Seon-Ja Kim; Kyeong-Yeol Yu; Dae-Hwan Hwang, all of Daejeon, Rep. of Korea

[73] Assignees: Electronics and Telecommunications Research Institute, Daejeon; Korea Telecommunication Authority, Seoul, both of Rep. of Korea

[21] Appl. No.: 08/770,199

[22] Filed: Dec. 19, 1996

[30] Foreign Application Priority Data

Dec. 23, 1995 [KR] Rep. of Korea ............. 95-55901

[51] Int. Cl.[7] ............. H04N 9/74; H04N 9/76; H04N 9/268

[52] U.S. Cl. ............. 348/596; 348/596; 348/598; 348/593; 348/580; 345/340; 345/342; 345/344; 345/507; 382/284; 382/295; 382/298

[58] Field of Search ............. 348/596, 598, 348/593, 584, 580, 581, 578, 561, 705; 345/340, 342, 344, 507, 508, 509, 196; 382/284, 295, 298; H04N 9/74, 9/76

[56] References Cited

U.S. PATENT DOCUMENTS

| | | | |
|---|---|---|---|
| 4,792,856 | 12/1988 | Shiratsuchi | 348/561 |
| 4,814,884 | 3/1989 | Johnson et al. | 348/596 |
| 5,099,331 | 3/1992 | Truong | 348/584 |
| 5,402,513 | 3/1995 | Schafer | 348/596 |
| 5,432,560 | 7/1995 | Ersoz et al. | 348/565 |
| 5,446,499 | 8/1995 | Kim | 348/596 |
| 5,473,371 | 12/1995 | Choi | 348/239 |
| 5,500,654 | 3/1996 | Fujimoto | 382/298 |
| 5,598,525 | 1/1997 | Nalley et al. | 395/520 |
| 5,710,573 | 1/1998 | Hung et al. | 382/298 |
| 5,854,628 | 12/1998 | Nakagawa | 345/340 |
| 5,903,268 | 5/1999 | Hirayama | 345/342 |

FOREIGN PATENT DOCUMENTS

| | | |
|---|---|---|
| O 660602A2 | 6/1995 | European Pat. Off. . |
| 2224410 | 5/1990 | United Kingdom ............. H04N 9/74 |

*Primary Examiner*—John K. Peng
*Assistant Examiner*—Paulos Natnael
*Attorney, Agent, or Firm*—Jacobson, Price, Holman & Stern PLLC

[57] ABSTRACT

An improved video window control apparatus and a method thereof which are capable of generating a plurality of video windows on a television or a computer monitor, controlling the size and position thereof, and providing a video window overlap function and a picture-in-picture function. The apparatus includes a video window flow control means for controlling the size based on an input control of a video window and a position and overlap of the video windows based on a video output control and for outputting a video windows input control signal, a video output control signal, and a video selection signal, a plurality of video memory means for receiving a video signal outputted from an external video input and processing means in accordance with the video input control signal and for limitedly outputting the video signals in accordance with a video output control signal, and a video combining means for combining the video signals from the video memory into one video signal in accordance with the video selection signal and for outputting the video signal to an external video output means.

11 Claims, 4 Drawing Sheets

VIDEO WINDOW CONTROL APPARATUS AND METHOD THEREOF

BACKGROUND OF THE INVENTION

1. Field of the Invention

The present invention relates to a video window control apparatus and a method thereof, and particularly, to an improved video window control apparatus and a method thereof which are capable of generating a plurality of video windows on a television or a computer monitor, controlling the size and position thereof, and providing a video window overlap function and a picture-in-picture function.

2. Description of the Conventional Art

FIG. 1 is a view illustrating a video window overlap and a picture-in-picture in the conventional art.

The video window overlap means that one video window partially overlaps on another video window in a television or a computer monitor.

In addition, the picture-in-picture means that one video window is fully included in another video window in a television or a computer monitor.

The conventional video window control apparatus has only a Picture In Picture (PIP) function which is directed to split a video window into a predetermined number and display a plurality of video windows on one screen of a television or a computer monitor. The conventional video window control apparatus does not have a function for overlapping the video windows.

In addition, the apparatus having a picture-in-picture function is limited to few methods for controlling the size of the video windows. In addition, the video windows are limited to few positions.

SUMMARY OF THE INVENTION

Accordingly, it is an object of the present invention to provide an improved video window control apparatus and a method thereof which overcome the problems encountered in the conventional art.

It is another object of the present invention to provide an improved video window control apparatus and a method thereof which are capable of generating a plurality of video windows on a television or a computer monitor, controlling the size and position thereof, and providing a video window overlap function and a picture-in-picture function.

To achieve the above objects, there is provided an improved video window control apparatus which includes a video window flow control means for controlling the size based on an input control of a video window and a position and overlap of the video windows based on a video output control, and for outputting a video input control signal, a video output control signal, and a video selection signal, a plurality of video memory means for receiving a video signal outputted from an external video input and processing means in accordance with the video input control signal and for limitedly outputting the video signals in accordance with a video output control signal, and a video combining means for combining the video signals from the video memory into one video signal in accordance with the video selection signal and for outputting the video signal to an external video output means.

To achieve the above objects, in accordance with a first embodiment of the present invention, there is provided an improved video window control method which includes the steps of a first step for judging an input video size magnification Wn of an n-th video, a second step for sub-sampling a video signal inputted to a video memory in accordance with a window size control signal based on the input video size magnification Wn, a third step for judging whether a control of a plurality of video windows is performed, and a fourth step for judging a video size magnification in accordance with the change of an n-th video window size magnification when the control of the plurality of the video windows is performed of for generating a window size control signal, wherein a video window control apparatus includes a video window flow control means for controlling the size based on an input control of a video window and a position and overlap of the video windows based on a video output control and for outputting a video windows input control signal, a video output control signal, and a video selection signal, a plurality of video memory means for receiving a video signal outputted from an external video input and processing means in accordance with the video input control signal and for limitedly outputting the video signals in accordance with a video output control signal, and a video combining means for combining the video signals from the video memory into one video signal in accordance with the video selection signal and for outputting the video signal to an external video output means.

To achieve the above objects, in accordance with a second embodiment of the present invention, there is provided an improved video window control method which includes the steps of a first step for judging a window size magnification Wn in accordance with an output position of an n-th video, the priority thereof, and an input video size magnification Wn, a second step for counting a pixel output position X, Y of a corresponding video window, and judging whether the corresponding video must be outputted in a pixel position in which the current value is outputted, a third step for judging an overlap with another output video window in accordance with an output from a corresponding video window and the priority thereof, outputting a corresponding video pixel value in a predetermined position, and judging whether the value is referred to a control of a plurality of video windows, and a fourth step for judging the position of a corresponding video window, an overlap, and a final pixel in accordance with the control of the plurality of video windows and for changing the routing to the first step or the second step, wherein a video window control apparatus includes a video window flow control means for controlling the size based on an input control of a video window and a position and overlap of the video windows based on a video output control and for outputting a video windows input control signal, a video output control signal, and a video selection signal, a plurality of video memory means for receiving a video signal outputted from an external video input and processing means in accordance with the video input control signal and for limitedly outputting the video signals in accordance with a video output control signal, and a video combining means for combining the video signals from the video memory into one video signal in accordance with the video selection signal and for outputting the video signal to an external video output means.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
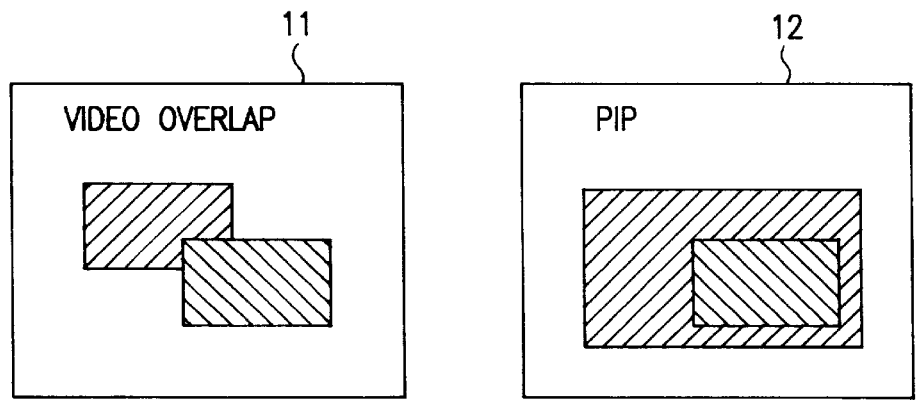
FIG. 1 is a view illustrating a video window overlap and a picture-in-picture in the conventional art.
Figure 2:
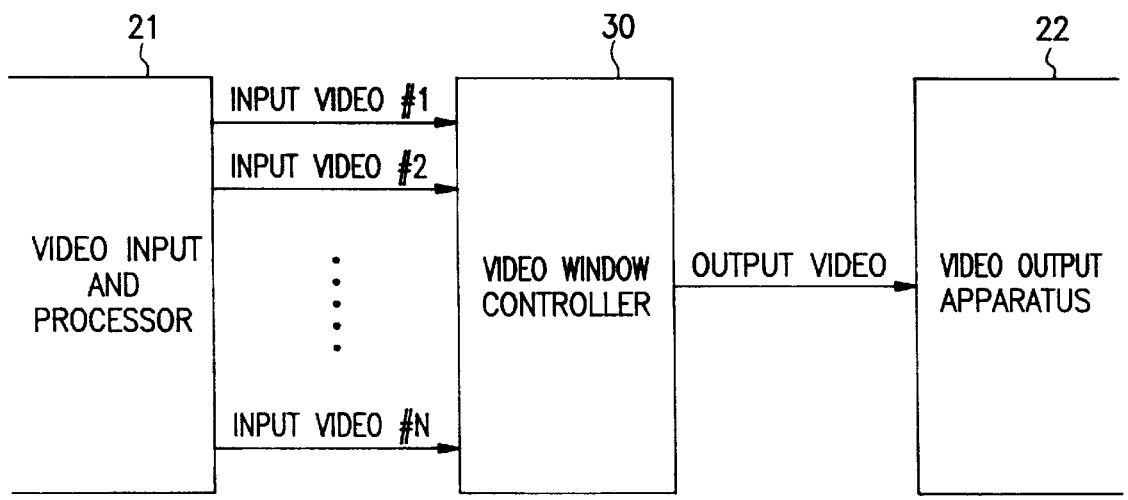
FIG. 2 is a view illustrating the construction of a video window input/output system according to the present invention.

FIG. 2 is a view illustrating the construction of a video window input/output system according to the present invention.

As shown therein, a video window input and processing apparatus 21 is an apparatus such as a video window input apparatus for receiving a camera input signal and converting the analog signal into a digital image, a codec apparatus for compressing/decompressing video window signals, and a processing apparatus for processing video window signals.

A video window output apparatus 22 is a final output apparatus for displaying the digital image signal on a television screen or a computer monitor.

Here, the video window control apparatus according to the present invention is basically directed to receiving video window signals from the video window input and processing processor 21, controlling the video window signals in accordance with the control method according to the present invention, converting the signals into one video window signal, and transferring the signals to the video window output apparatus 22.

Figure 3:
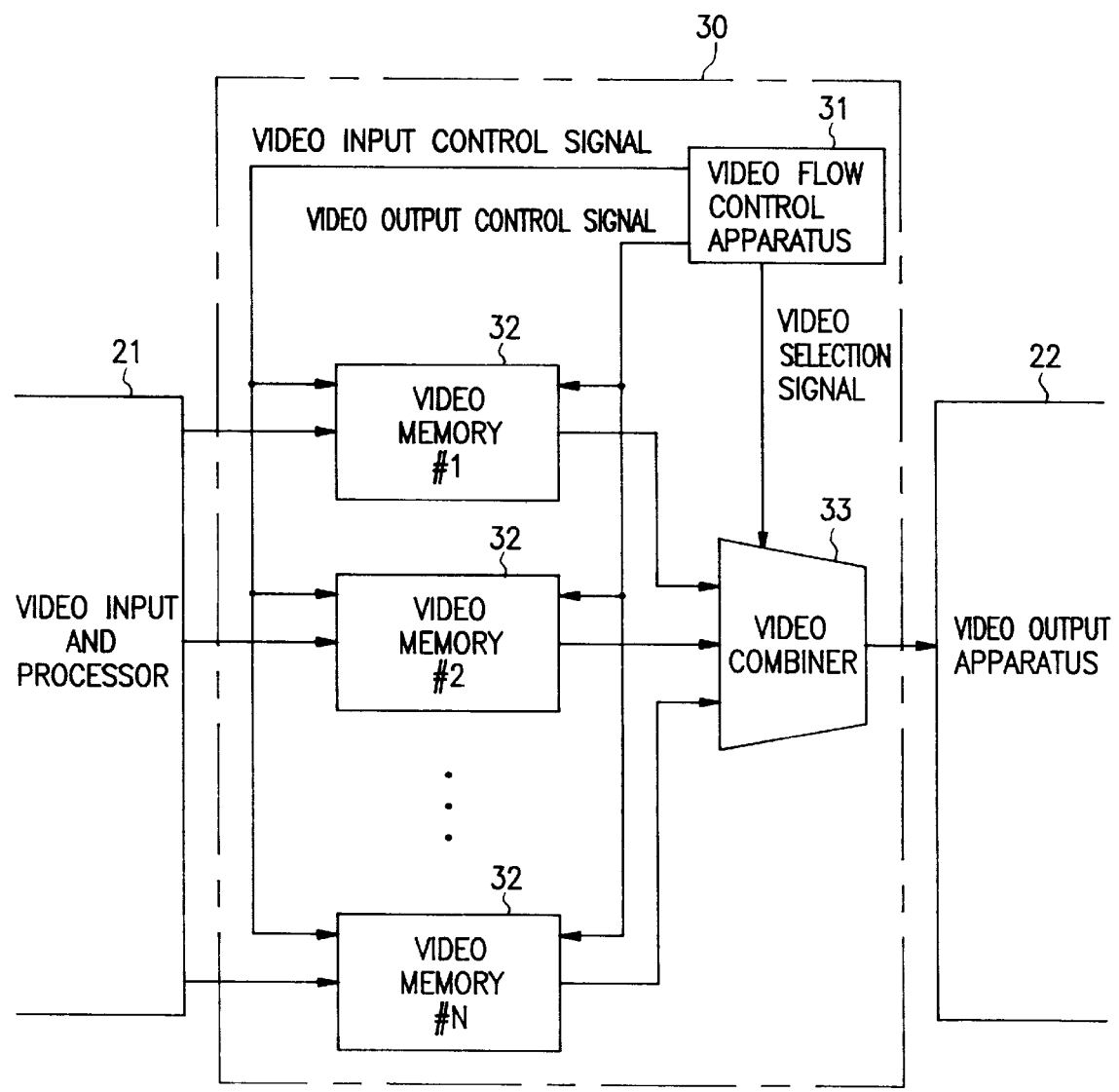
FIG. 3 is a view illustrating the construction of a video window control apparatus according to the present invention.

FIG. 3 is a view illustrating the construction of a video window control apparatus according to the present invention.

In the drawing, reference numeral 32 denotes a video window memory 1 through "N", and 33 denotes a video window combining apparatus.

As shown therein, a video window flow control apparatus 31 is the main apparatus of the present invention. Namely, the video window flow control apparatus 31 serves to control the size of the video window based on an input control signal, and the position, overlap, and Picture-In-Picture (PIP) of the video window based on the video window output control. The video window input control signal is transferred to the video memory 32 for controlling the input video signal from the video memory 32. The video window output control signal is outputted to the video memory 32 for controlling the output video window signal from the video window combining apparatus 33.

In addition, the video window flow control apparatus 31 is directed to transferring a video window selection signal related to a video window position, overlap, and size thereof to the video window combining apparatus 33 for combining the output video window signals transmitted to the video window combining apparatus 3 into one video window signal.

The video window combining apparatus 33 receives a control from the video window flow control apparatus 31, combines the output video window signals from the video memory 32 to one video window signal, and transmits the signals to an externally connected video window output apparatus 22. Instead of the video window combining apparatus 33, a signal multiplexer may be used. If the output signal from the video memory 32 is a tri-state, it is possible to connect signal cables without using an additional apparatus.

The video memory 32 receives a control from the video window flow control apparatus 31, and video window signals for controlling the size of the video window. The video window signal outputted is limitedly outputted so as to provide the overlap and PIP functions. For the processing of the video window signals, a FIFO (First In First Out) is preferably used, and the input/output signal must be provided as many as the number of bits of the video window signal.

In addition, the input/output operation must simultaneously performed in a dual port system, and the control of the input/output operation is performed irrespective of an input/output clock, and a path for setting at a predetermined period must be formed.

The video memory 32 may include a random access memory (RAM) and a buffer, and the FIFO memory. A field memory may be preferably used.

The video window control method according to the present invention includes a video window size control, a video window position control, a video window overlap, and a PIP control. The size of the video window is controlled when inputting/outputting the signals into/from the video window memory 32.

The synchronous video window clock of the video signal inputted is masked by using an enable signal and stored in the video window memory. The enable control signal is used by splitting the synchronous video window clock and the video horizontal synchronous signal by the video size.

In the case of controlling during the output, the output is performed by the same method. In the case of the output, since other control signals may be contained, the above-described operation is preferably performed during the input operation.

Figure 4:
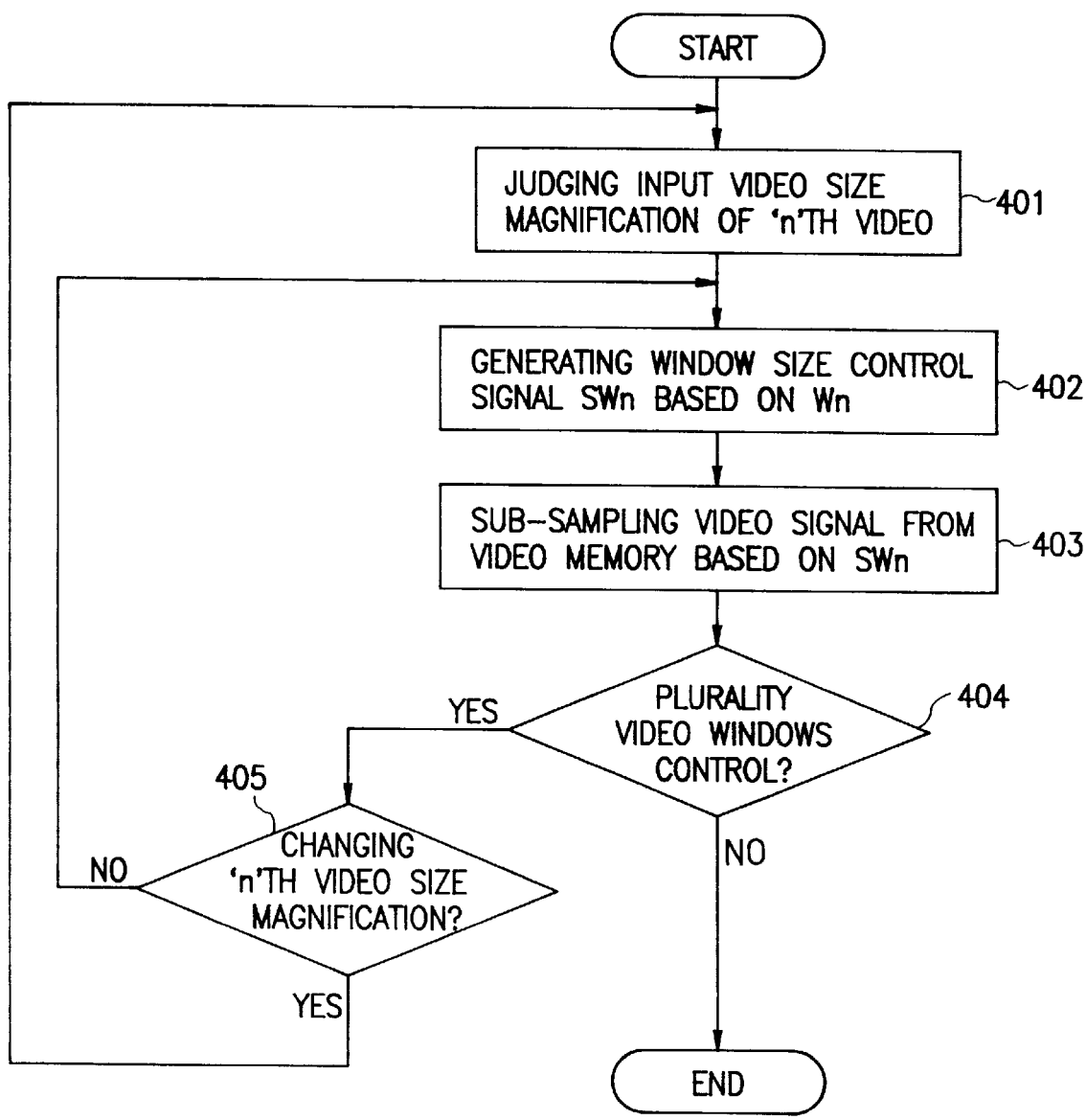
FIG. 4 is a flow chart of a video window size control method according to the present invention.

FIG. 4 is a flow chart of a video window size control method according to the present invention.

Among various video windows, one video window control operation is described therein. The remaining video windows are controlled by the same method. The video window control operations are started at the same time and are parallely processed.

When the video window control is started, the input video size magnification Wn of n-th video window is checked in step 401. The input video window size magnification Wn is externally inputted. The size magnification is referred to ½, ¼, ⅛, etc.

The window size control signal SWn is generated in accordance with the input video window size magnification Wn in step 402. The window size control signal SWn is an enable signal for limitedly receiving the video window signal inputted. As the limitation method, there are a sub-sampling method and an interpolation method.

In addition, the video signal inputted to the video memory 32 in accordance with the generated window size control signal SWn is sub-sampled in step 403, and the current multiple video window control process is judged to be performed in step 404. If the control process is performed, the size magnification of n-th video is judged to be varied by the main system in step 405.

As a result of the judgement, if the size magnification of n-th video is varied, the routine is changed to step 401 which is directed to judging the input video size magnification of n-th video. Otherwise, the routine is changed to step 402 which is directed to generating a window size control signal SWn in accordance with the input video size magnification Wn of n-th video, and the control is performed at the same size magnification.

As a result of the judgement, if the size magnification of n-th video was not varied, the control is terminated.

In addition, in the video position control method, the range of a position value in which the video in the window is positioned is determined by setting a start coordinate, an end coordinate or size in which the video is positioned with respect to each video. Thereafter, the video signal inputted into the video memory 32 is selected in synchronization with the video output clock. Namely, the counter is operated in synchronization with the output video clock from the inner apparatus, and the counter determines the positions of each video and becomes a reference.

If the value of the counter is within the range of the position value in which the video is positioned, and the video memory 32 is controlled to output a video data. The value of the counter is reset once whenever the video vertical synchronous signal is outputted.

In addition, the video window overlap and PIP effect control method is implemented by previously setting the priority with respect to each video. In this case, it is possible to check a special case of the video position control. Namely, there are more than two videos which are within the range of the position value.

In this case, when outputting a few video windows at the same time, it is impossible to see picture due to the overlap between the video windows. Therefore, the video having the priority is outputted by controlling the video combining apparatus 33 or the video memory 32.

Figure 5:
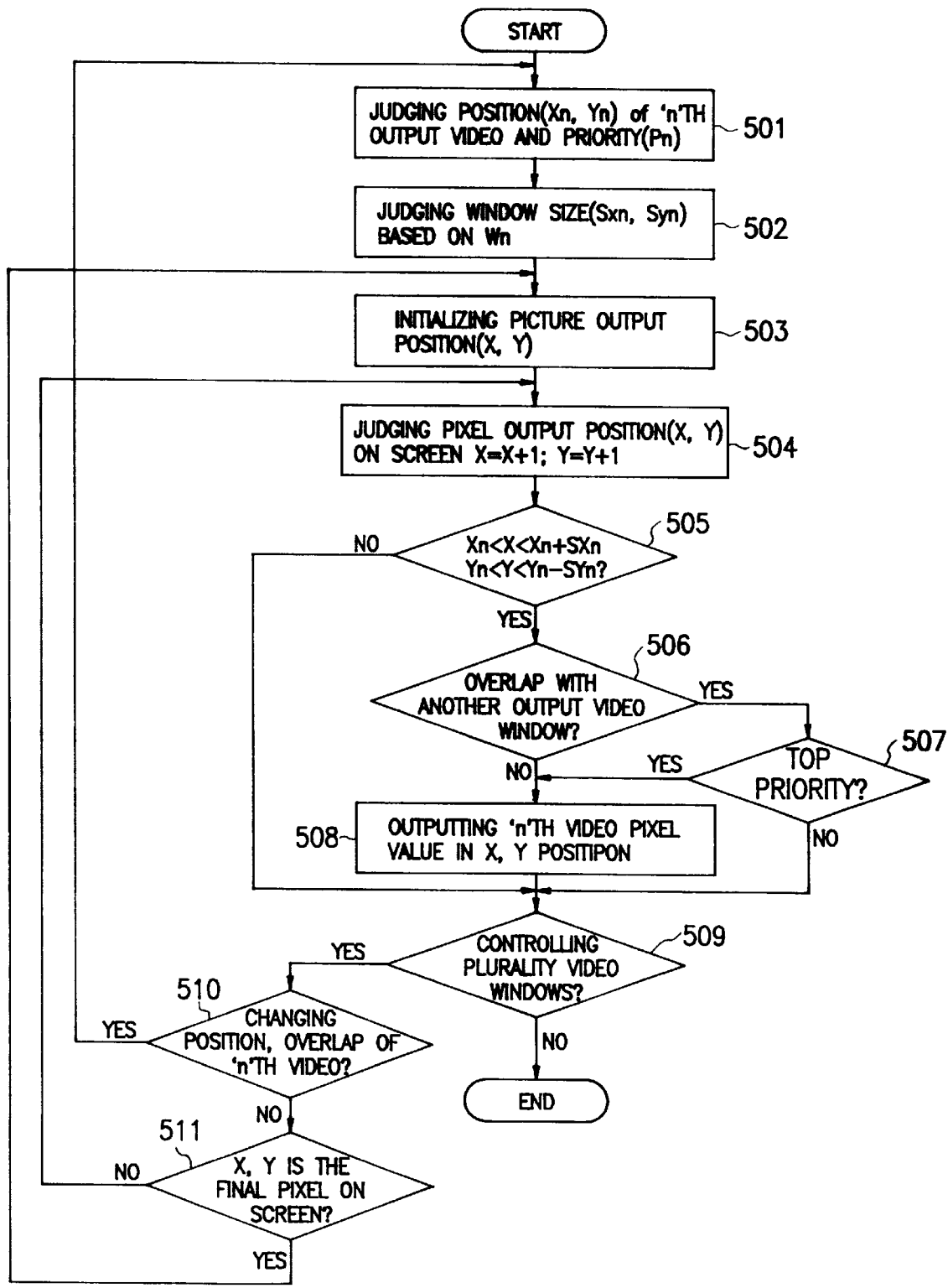
FIG. 5 is a flow chart of a video window position/overlap control method according to the present invention.

FIG. 5 is a flow chart of a video window position/overlap control method according to the present invention. As shown therein, identically to FIG. 4, a control operation with respect to one video is described, and the control with respect to the multiple videos is performed by the processes as shown in FIG. 5. In addition, the flow charts as shown in FIGS. 4 and 5 are performed at the same time.

the output position Xn, Yn and the priority Pn of the video of a corresponding video on a computer monitor or a television of n-th output video are judged in step 501. The output position Xn, Yn indicates a Y-coordinate of an X-coordinate on the screen of a corresponding video, and the priority Pn is a parameter so as to determine whether the corresponding video is actually displayed on the screen or is hidden.

In addition, in step 502, the corresponding video window size (SXn, SYn) is judged in accordance with Wn determined by the method as shown in FIG. 4, and the corresponding video window size (SXn, SYn) is the actual size of the video window.

The actual window output position (X, Y) of the corresponding video window is initialized as X=0, and Y=0 in step 503, and then the pixel output position (X, Y) of the window is determined by counting the position (X, Y) in step 504. This counting process is directed to increasing the value of "Y" by 1 when the actual window has an X-resolution. The above-described process is continued until the value of "Y" has the Y-resolution.

It is judged whether the corresponding video is outputted in the pixel position in which the current output is outputted based on Xn<X<SXn, Yn<Y<SYn in step 505. If the corresponding video is outputted, it is judged whether the corresponding video window overlaps with another video window in step 506.

If the corresponding video window does not overlap with other video windows, the pixel value of the corresponding video window corresponding to the position of X, Y is outputted in step 508. If the corresponding video window overlaps with other video windows, it is judged whether the corresponding video window has a higher priority compared with the priorities of other video windows in step 507.

As a result, the corresponding video window has the top priority, the pixel value of the corresponding video window is outputted in step 508. Otherwise, the value is not outputted.

Therefore, it is possible to control the overlaps of the plurality of the video windows by the above described processes.

If the corresponding video is not outputted in the pixel position in which the current value is outputted, or if the corresponding video window does not have a higher priority, an n-th video pixel value is outputted in the position X, Y, and then it is judged whether the current video window is controlled in step 509.

As a result, if the control is not performed, the video window control is terminated. If the control is continued, it is judged whether the corresponding video window is overlapped with another video window, or whether there is a change in the priority in step 510.

Here, if there occurred a change, the routine is changed to a step 503 which is directed to judge the position Xn, Yn of the n-th output video and the priority Pn. Otherwise, it is judged whether the value X, Y is the final pixel value of the video window in step 511. Here, the final pixel is the final position of the entire video resolution displayed on the computer monitor or the television. Namely, it is the lowermost and leftmost pixel.

As a result of the judgement, it is the final pixel, the output position X, Y is initialized in step 503. Otherwise, the routine is changed to a step 504 which is directed to judging the pixel output position X, Y on the screen.

As described above, the video window control apparatus and a method thereof according to the present invention is directed to displaying a plurality of video windows on a television or a computer monitor at the same time, controlling the position, size, overlap, and PIP thereof, for thus effectively using the methods for various multimedia systems.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A video window control apparatus, comprising:
    a video window flow control means for outputting a video input control signal which is used for controlling size of video windows, a video output control signal which is used for controlling positions and overlapping status of the video windows, and a video selection signal;
    a plurality of video memory means for receiving a video signal outputted from an external video input and processing means in accordance with the video input control signal and for limitedly outputting video signals in accordance with the video output control signal; and a video combining means for combining the video signals outputted from the plurality of video memory means into one video signal in accordance with the video selection signal and for outputting the combined video signal to an external video output means, wherein each video memory means of said plurality of video memory means is directed to performing an input/output operation at the same time when the input/output signal is the number of bits of the video window.

2. The apparatus of claim 1, wherein each video memory means of said plurality of video memory means includes either an additional buffer in a RAM (random access memory) and a buffer, or a FIFO (first in first out) memory, or a field memory.

3. The apparatus of claim 1, wherein each video memory means of said plurality of video memory means includes a path for periodically resetting the control of the input and output irrespective of the input/output clock.

4. The apparatus of claim 1, wherein said video combining means includes a signal multiplexer.

5. The apparatus of claim 1, wherein said video combining means is directed to connecting signal cables without using an additional circuit when the output video signals from the plurality of video memory means are in tri-state.

6. A video window control method wherein a video window control apparatus includes a video window flow control means for controlling the size based on an input control of a video window and a position and overlap of the video windows based on a video output control and for outputting a video windows input control signal, a video output control signal, and a video selection signal, a plurality of video memory means for receiving a video signal outputted from an external video input and processing means in accordance with the video input control signal and for limitedly outputting the video signals in accordance with a video output control signal, and a video combining means for combining the video signals from the plurality of video memory means into one video signal in accordance with the video selection signal and for outputting the video signal to an external video output means, comprising the steps of:

a first step for judging an input video size magnification Wn of an n-th video;

a second step for sub-sampling a video signal inputted to the plurality of video memory means in accordance with a window size control signal based on the input video size magnification Wn;

a third step for judging whether a control of a plurality of video windows is performed; and a fourth step for judging a video size magnification in accordance with the change of an n-th video window size magnification when the control of the plurality of the video windows is performed for generating said window size control signal.

7. A video window control method wherein a video window control apparatus includes a video window flow control means for controlling the size based on an input control of a video window and a position and overlap of the video windows based on a video output control and for outputting a video windows input control signal, a video output control signal, and a video selection signal, a plurality of video memory means for receiving a video signal outputted from an external video input and processing means in accordance with the video input control signal and for limitedly outputting the video signals in accordance with a video output control signal, and a video combining means for combining the video signals from the plurality of video memory means into one video signal in accordance with the video selection signal and for outputting the video signal to an external video output means, comprising the steps of:

a first step for judging a window size magnification Wn in accordance with an output position of an n-th video, the priority thereof, and an input video size magnification Wn;

a second step for counting a pixel output position X, Y of a corresponding video window, and judging whether the corresponding video must be outputted in a pixel position in which the current value is outputted;

a third step for judging an overlap with another output video window in accordance with an output from a corresponding video window and the priority thereof, outputting a corresponding video pixel value in a predetermined position, and judging whether the value is referred to a control of a plurality of video windows; and a fourth step for judging the position of a corresponding video window, an overlap, and a final pixel in accordance with the control of the plurality of video windows and for changing the routing to the first step or the second step.

8. The method of claim 7, wherein said second step includes:

a fifth step for initializing an actual picture output position of a corresponding video window;

a sixth step for judging a pixel output position on a screen; and a seventh step for judging whether a corresponding video window is outputted in a pixel position which is currently outputted.

9. The method of claim 8, wherein said sixth step is directed to increasing the value of Y when the output position is referred to an X-coordinate and Y-coordinate on a screen of a corresponding video, and when the counting of X-side is performed up to an X-resolution of the actual picture, and then the counting of a Y-side is performed up to a Y-resolution.

10. The method of claim 7, wherein said third step includes:

a fifth step for judging whether a corresponding video windows is outputted in a pixel position in which the video signal is currently outputted after the second step, and the video window overlaps with another output video window;

a sixth step for judging the priority of the corresponding video windows when the current video window overlaps with another video window after the fifth step;

a seventh step for outputting an n-th video pixel value in the corresponding position when the corresponding video window does not overlap with another video window, and the priority thereof is higher than other output video windows after the fifth step or the sixth step; and an eighth step for judging whether the control of a plurality of current video windows is performed when the corresponding video is not outputted in the pixel position, the priority thereof is not higher than other video windows, and an n-th video pixel value is outputted in the corresponding position.

11. The method of claim 8, wherein said fourth step includes:

an eighth step for judging whether there is a position and overlap change of an n-th video window when a plurality of video windows are controller;

a ninth step for changing the routine to a first step which is directed to judging the window size in accordance with the output position, and the input video size magnification Wn of an n-th video window when there is a position and overlap change of an n-th video window, and judging the output position X, Y on the screen of the corresponding video is referred to the final pixel when there is not any changes; and a tenth step for changing the routine to the fifth step which is directed to initializing the actual picture output position of a corresponding video window when it is referred to the final pixel as a result of the judgement, and changing the routine to the sixth step which is directed to judging the pixel output position on the screen when it is not referred to the final pixel.

* * * * *